(12) United States Patent
Franzen

(10) Patent No.: US 8,790,206 B2
(45) Date of Patent: Jul. 29, 2014

(54) VARIABLE RANGE CONSTANT SPEED DRIVE

(75) Inventor: Mark F. Franzen, Brodhead, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 271 days.

(21) Appl. No.: 13/354,989

(22) Filed: Jan. 20, 2012

(65) Prior Publication Data

US 2013/0186234 A1    Jul. 25, 2013

(51) Int. Cl.
*F16H 47/08*    (2006.01)

(52) U.S. Cl.
USPC .......................................................... 475/77

(58) Field of Classification Search
USPC .......................................................... 475/77
See application file for complete search history.

(56) References Cited

U.S. PATENT DOCUMENTS

| | | | | |
|---|---|---|---|---|
| 2,504,040 | A | * | 4/1950 | Orshansky, Jr. ................... 475/2 |
| 2,995,049 | A | * | 8/1961 | Bolliger .......................... 475/77 |
| 3,023,638 | A | * | 3/1962 | Westbury et al. ............... 475/77 |
| 4,679,462 | A | * | 7/1987 | Baits et al. ...................... 475/77 |
| 5,042,630 | A | | 8/1991 | Hutchison |
| 5,068,591 | A | | 11/1991 | Hoegberg et al. |
| 6,527,660 | B1 | | 3/2003 | Sugden |
| 2009/0236854 | A1 | | 9/2009 | Tseng et al. |

\* cited by examiner

*Primary Examiner* — Sherry Estremsky
(74) *Attorney, Agent, or Firm* — Cantor Colburn LLP

(57) ABSTRACT

A constant speed drive includes one or more speed summing differentials operably connected to a base shaft and a machine shaft. A primary variator is operably connected to the one or more speed summing differentials to produce a selected constant rotational speed at the machine shaft across a range of engine speeds at the base shaft. An operating range adjustment element is operably connected to the one or more speed summing differentials to adjust a range of engine speeds at which the constant speed drive can output the selected constant rotational speed at the machine shaft.

16 Claims, 2 Drawing Sheets

VARIABLE RANGE CONSTANT SPEED DRIVE

BACKGROUND OF THE INVENTION

The subject matter disclosed herein relates to constant speed drives. More specifically, the subject matter disclosed herein relates to improvements in the operating range of constant speed drives.

In a typical constant speed drive (CSD), input power is taken from a prime mover (such as an aircraft engine) which operates at a variable speed. The speed of the prime mover can be referred to as a base shaft speed. Power from the prime mover (i.e., base shaft) is fed through a speed-sum differential resulting in output power at a constant output speed over a range of the base shaft speed for which the differential is sized. This output power is often used to drive a component, such as an electrical generator, which operates at constant speed.

Because the base shaft is driven over a range of speeds, a speed variator is used in conjunction with the differential. The variator is connected to the differential via a trim shaft, which is driven at a proportion of the base shaft speed determined by the variator. In some systems, the variator is a hydraulic unit (pump-motor set). For example, variators commonly allow for a mapping of output speed to a 2-to-1 input speed range, which is useful for power extraction from the high pressure spool of the engine. Other applications, however, require greater operating ranges of the CSD. For example, constant frequency (CF) generators extracting power from the low pressure spool of the engine require mapping of output speed to about a 5-to-1 input speed range, while engine electric start systems using the CF electric machine as a synchronous motor require mapping the constant motor speed to the entire speed range of the engine high pressure spool from zero to maximum speed. Increasing the input speed range of a CSD, however, typically has an over-proportional effect on size and weight of the speed variator.

BRIEF DESCRIPTION OF THE INVENTION

In one embodiment, a constant speed drive includes one or more speed summing differentials operably connected to a base shaft and a machine shaft. A primary variator is operably connected to the one or more speed summing differentials to produce a selected constant rotational speed at the machine shaft across a range of engine speeds at the base shaft. A secondary range adjustment element is operably connected to the one or more speed summing differentials to adjust a range of engine speeds at which the constant speed drive can output the selected constant rotational speed at the machine shaft.

In another embodiment, a power generation system for an aircraft includes an engine connected to a base shaft and an electric machine connected to a machine shaft and a constant speed drive. The constant speed drive includes one or more speed summing differentials operably connected to the base shaft and the machine shaft. A primary variator is operably connected to the one or more speed summing differentials to produce a selected constant rotational speed at the machine shaft across a range of engine speeds at the base shaft. An operating range adjustment element is operably connected to the one or more speed summing differentials to adjust the range of engine speeds at which the constant speed drive can output the selected constant rotational speed at the machine shaft.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
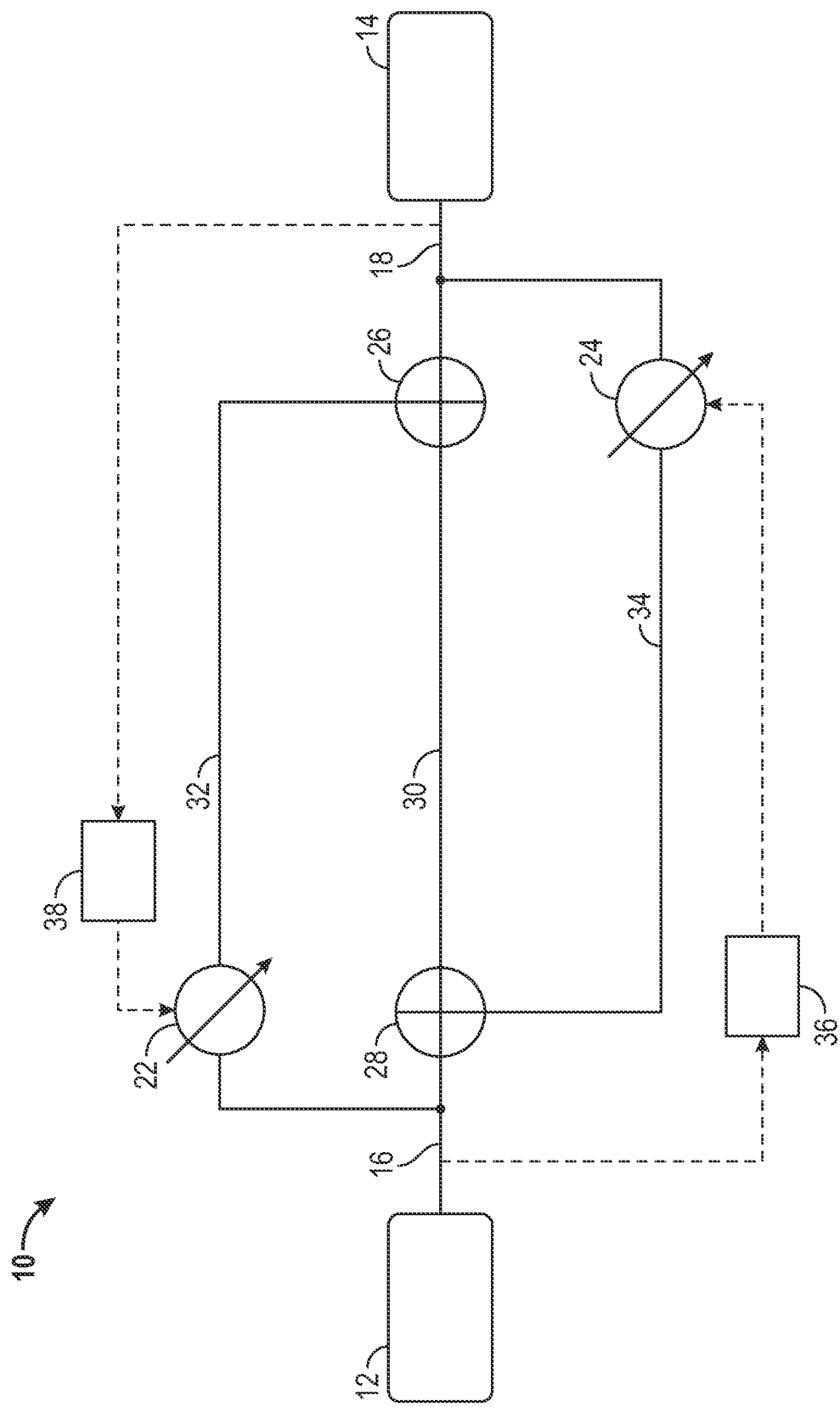
FIG. 1 is a schematic view of an embodiment of a constant speed drive.

Adjustable range CSD topologies disclosed herein provide design alternatives that can lessen speed variator size and weight. Shown in FIG. 1 is a schematic of an embodiment of a constant speed drive (CSD) 10. The CSD 10 is positioned between and connected to an engine 12 or other prime mover and an electric machine 14, for example, a generator or a motor, via a base shaft 16 and a machine shaft 18, respectively. In one embodiment, the combination of the engine 12, electric machine 14 and CSD 10 can be located on aircraft and used to generate electrical power for use by one or more systems aboard the aircraft. The CSD 10 adds to or subtracts from an input rotational speed provided by the engine 12 along the base shaft 16 to provide a constant selected output rotational speed to the electric machine 14 via the machine shaft 18.

The speed addition and subtraction is provided by a primary variator 22 and a secondary variator 24. The primary variator 22 is connected to a primary speed sum differential 26 at the machine shaft 18, and the secondary variator 24 is connected to a secondary speed sum differential 28 at the base shaft 16. The secondary variator 24 connected to the base shaft 16 at the secondary speed sum differential 28 may also be referred to as an operating range adjustment element. An augmented base shaft 30 extends between the primary speed sum differential 26 and the secondary speed sum differential 28. Power transmission between engine and electric machine is distributed among augmented base shaft and primary and secondary trim shafts. In one embodiment, the primary variator 22 and/or the secondary variator 24 is a hydraulic pump-motor combination, also known as a hydraulic unit. It is to be appreciated, however, that using other types of variators is contemplated within the present scope.

In some embodiments, the primary speed sum differential 26 and the secondary speed sum differential 28 are planetary gear systems having a ring gear, sun gear and a number of planet gears. The primary variator 22 adds or subtracts rotational speed at the primary speed sum differential 26 via a primary trim shaft 32, by increasing or decreasing a speed of the output summer ring gear, for example. Without engaging the primary variator 22, the machine shaft 18 will rotate at a fixed ratio to the base shaft 16. To achieve a selected constant output speed, the primary variator 22 is engaged.

To adjust the effective engine 12 speed operational range of the CSD 10, the secondary variator 24 is engaged. The secondary variator 24 receives information from a range controller 36 regarding the base shaft 16 speed and increases or decreases input speed at the secondary speed sum differential 28 via a secondary trim shaft 34. Because of the augmented base shaft 30 connecting the primary speed sum differential 26 and the secondary speed sum differential 28, a change in input speed to the secondary speed sum differential 28 by the secondary variator 32 translates to a proportionate change in input speed to the primary speed sum differential 26.

This allows, for example, the speed of the machine shaft 18 of the primary speed sum differential 26 to be increased at low rotational speeds of engine 12, and decreased at high rotational speeds of engine 12. The primary variator 22, receives a machine shaft 18 target speed and the machine shaft 18 actual speed at, for example, a CSD controller 38. The CSD controller 38 selects a primary variator 22 setting based on these values. With additional speed change applied to the ring gear, for example, of the secondary speed sum differential 28 by the secondary variator 24, the machine shaft 18 speed is further increased or decreased at low or high engine 12 speeds, respectively, to achieve the selected machine shaft 18 speed for operation of the electric machine 14.

In another embodiment, the CSD 10 may be operated backward, using the electric machine 14 as a motor to drive the engine 12 during startup. The range controller 36 sets the secondary variator 24 to a desired setting to provide the target speed of base shaft 16. The machine shaft 18 is rotated at a selected speed and the secondary variator 24 increases or reduces the rotational speed of the secondary trim shaft 34 to result in the desired speed of the base shaft 16. The desired speed can be lower or higher than the speed of the machine shaft 18. For startup mode of operation, the primary variator 22 is typically set to a fixed operating position.

Figure 2:
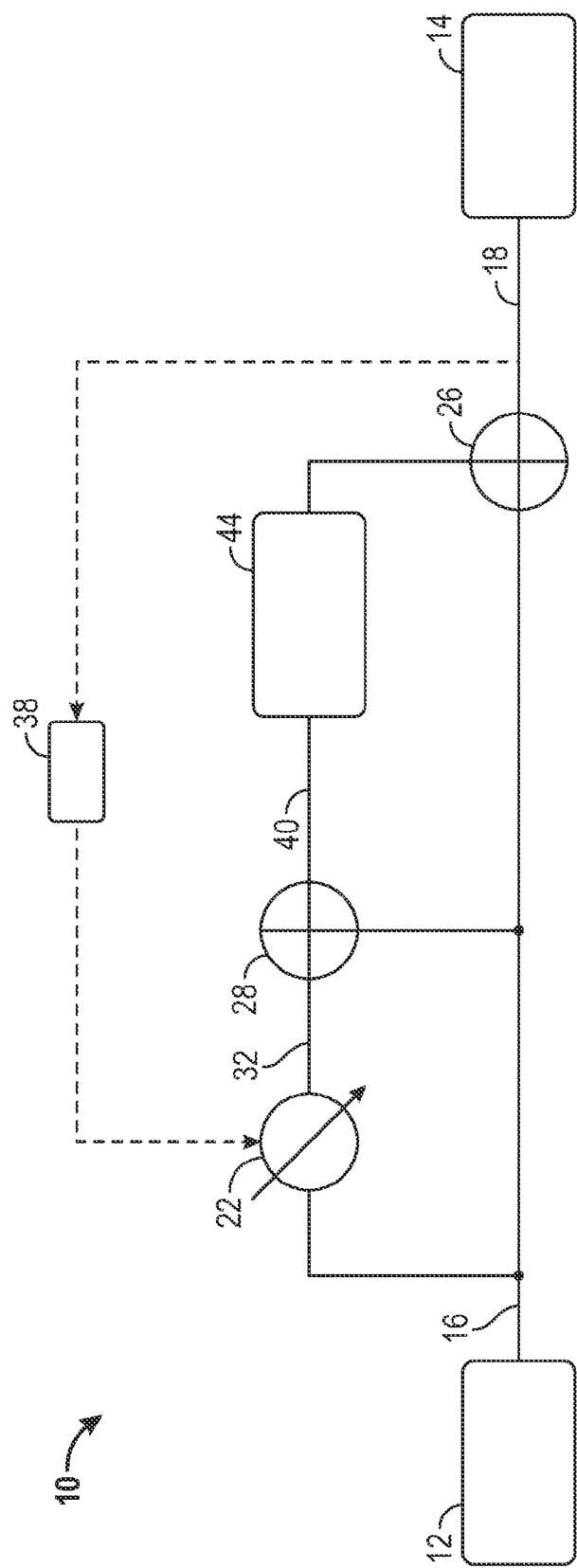
FIG. 2 is a schematic view of another embodiment of a constant speed drive.

A schematic of another embodiment of a CSD 10 is shown in FIG. 2. In this embodiment, the secondary speed sum differential 28 is located between the primary trim shaft 32 and an augmented trim shaft 40. Base shaft 16 extends to the primary variator 22, the primary speed sum differential 26 and the secondary speed sum differential 28. The primary variator 22, secondary speed sum differential 28 and gear shift 44 are operably connected to the primary speed sum differential 26. The primary variator 22, and secondary speed sum differential 28 allow for mapping the speed of the augmented trim shaft 40 to zero at a variator adjustment point near full stroke of the variator. If the gear shift 44 is speed-reversing, the speed reversal enables forward stroking of the primary variator 22 in a first gear position of the gear shift 44 to be followed by reverse stroking of the primary variator 22 in a second gear position of the gear shift 44, effectively doubling the operating range of the primary variator 22 across the first gear and second gear positions of the gear shift 44. The gear shift 44 connected to the base shaft 16 at the secondary speed sum differential 28 may also be referred to as an operating range adjustment element.

In another embodiment, the CSD 10 in FIG. 2 may be operated backward, using the electric machine 14 as a motor to drive the engine 12 during startup. The CSD controller 38 sets the primary variator 22 to a desired setting to provide the target speed of base shaft 16 based on measured speed of machine shaft 18. The gear shift 44 in conjunction with secondary speed sum differential 28 functions as an operating range adjustment element wherein the lower speed range, e.g. first gear position, is motor (starter) mode and the second gear position is generator mode. If the gear shift 44 is speed-reversing, the speed reversal enables forward stroking of the primary variator 22 in first gear position of the gear shift 44 to be followed by reverse stroking of the primary variator 22 in second gear position of the gear shift 44.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A constant speed drive comprising:
   one or more speed summing differentials operably connected to a base shaft and a machine shaft;
   a primary variator operably connected to the one or more speed summing differentials to produce a selected constant rotational speed at the machine shaft across a range of engine speeds at the base shaft; and
   an operating range adjustment element operably connected to the one or more speed summing differentials to adjust a range of engine speeds at which the constant speed drive can output the selected constant rotational speed at the machine shaft;
   wherein the operating range adjustment element includes a secondary variator operably connected to a secondary speed summing differential of the one or more speed summing differentials operably connected to the machine shaft.

2. The constant speed drive of claim 1, wherein the secondary variator increases or decreases a speed of a secondary trim shaft operably connected to the secondary speed summing differentials depending on the speed of the base shaft.

3. The constant speed drive of claim 2, wherein the increase or decrease in secondary trim shaft speed adjusts a speed range of the constant speed drive depending on the speed of the base shaft.

4. The constant speed drive of claim 1, wherein the secondary variator is a hydraulic pump and motor.

5. The constant speed drive of claim 1, wherein the primary variator is operably connected to a primary speed summer of the one or more speed summing differentials.

6. The constant speed drive of claim 1, wherein the primary variator is operably connected to a constant speed drive controller and the operating range adjustment element is operably connected to a range controller.

7. The constant speed drive of claim 1, wherein the operating range adjustment element comprises a mechanical mesh gear set.

8. The constant speed drive of claim 7, wherein shifting the gear set between a first gear position and a second gear position extends the operability range of the primary variator.

9. A power generation system for an aircraft comprising:
   an engine connected to a base shaft;
   an electric machine connected to a machine shaft; and
   a constant speed drive including:
      one or more speed summing differentials operably connected to the base shaft and the machine shaft;
      a primary variator operably connected to the one or more speed summing differentials to produce a selected constant rotational speed at the machine shaft across a range of engine speeds at the base shaft; and
      an operating range adjustment element operably connected to the one or more speed summing differentials to adjust a range of engine speeds at which the constant speed drive can output the selected constant rotational speed at the machine shaft;

wherein the operating range adjustment element includes a secondary variator operably connected to a secondary speed summing differential of the one or more speed summing differentials operably connected to the base shaft.

10. The power generation system of claim 9, wherein the secondary variator increases or decreases a speed of a secondary trim shaft operably connected to the secondary speed summing differential depending on the speed of the base shaft.

11. The power generation system of claim 10, wherein the increase or decrease in speed to the secondary speed summing differential adjusts the range of the constant speed drive depending on the speed of the base shaft.

12. The power generation system of claim 9, wherein the secondary variator is a hydraulic pump and motor.

13. The power generation system of claim 9, wherein the primary variator is operably connected to a primary speed summing differential of the one or more speed summing differentials.

14. The power generation system of claim 9, wherein the primary variator is operably connected to a constant speed drive controller and the operating range adjustment element is operably connected to a range controller.

15. The power generation system of claim 9, wherein the secondary range adjustment element comprises a mechanical mesh gear set.

16. The power generation system of claim 15, wherein shifting the gear shift element from a first gear position to a second gear position extends the operability range of the primary variator.

* * * * *